(12) United States Patent
Lee et al.

(10) Patent No.: US 8,116,622 B2
(45) Date of Patent: Feb. 14, 2012

(54) PHOTOGRAPHING METHOD AND APPARATUS USING AN INFRARED SENSOR TO CONTROL PLURAL CAMERA FUNCTIONS

(75) Inventors: Kang-Min Lee, Suwon-si (KR); Young-Kwon Yoon, Seoul (KR); Yong-Gu Lee, Bucheon-si (KR)

(73) Assignee: Samsung Electronics Co., Ltd., Maetan-Dong, Yeongtong-Gu, Suwon-Si, Gyeonggu-Do (KR)

( * ) Notice: Subject to any disclaimer, the term of this patent is extended or adjusted under 35 U.S.C. 154(b) by 334 days.

(21) Appl. No.: 12/190,656

(22) Filed: Aug. 13, 2008

(65) Prior Publication Data

US 2009/0052883 A1 Feb. 26, 2009

(30) Foreign Application Priority Data

Aug. 24, 2007 (KR) .................. 10-2007-0085486

(51) Int. Cl.
*G03B 17/00* (2006.01)
(52) U.S. Cl. .................. 396/263; 396/59; 396/543
(58) Field of Classification Search .................. 396/263
See application file for complete search history.

(56) References Cited

U.S. PATENT DOCUMENTS

| | | | | |
|---|---|---|---|---|
| 4,866,470 A * | 9/1989 | Arai et al. | ...... | 396/540 |
| 5,210,560 A * | 5/1993 | Labaziewicz | ...... | 396/296 |
| 5,606,390 A * | 2/1997 | Arai et al. | ...... | 396/51 |
| 5,724,619 A * | 3/1998 | Hamada et al. | ...... | 396/82 |
| 5,757,428 A * | 5/1998 | Takei | ...... | 348/333.03 |
| 5,815,750 A * | 9/1998 | Ishiguro | ...... | 396/201 |
| 5,923,908 A * | 7/1999 | Schrock et al. | ...... | 396/85 |
| 5,943,516 A * | 8/1999 | Uchiyama et al. | ...... | 396/281 |
| 6,148,154 A * | 11/2000 | Ishimaru et al. | ...... | 396/287 |
| 6,535,694 B2 * | 3/2003 | Engle et al. | ...... | 396/263 |
| 6,633,231 B1 * | 10/2003 | Okamoto et al. | ...... | 340/539.11 |
| 7,027,094 B2 * | 4/2006 | Battles et al. | ...... | 348/333.01 |
| 7,122,798 B2 * | 10/2006 | Shigenaka et al. | ...... | 250/338.1 |
| 7,167,201 B2 * | 1/2007 | Stavely et al. | ...... | 348/333.03 |
| 7,400,347 B2 * | 7/2008 | Krogmann et al. | ...... | 348/207.99 |
| 7,697,827 B2 * | 4/2010 | Konicek | ...... | 396/56 |
| 2004/0212711 A1 * | 10/2004 | Stavely et al. | ...... | 348/333.03 |
| 2008/0192129 A1 * | 8/2008 | Walker et al. | ...... | 348/231.2 |
| 2008/0267607 A1 * | 10/2008 | Mori | ...... | 396/374 |

\* cited by examiner

*Primary Examiner* — Clayton E Laballe
*Assistant Examiner* — Bret Adams
(74) *Attorney, Agent, or Firm* — Cha & Reiter, LLC

(57) ABSTRACT

Disclosed is a photographing apparatus using an infrared ray in a portable terminal, the apparatus includes: a camera module for photographing an image; a display unit for providing a preview for the image photographed by the camera module; and an infrared sensor unit for determining if light is obstructed by emitting and receiving an infrared ray through an infrared sensor upon photographing by the camera module, and outputting a photographing signal for the image.

17 Claims, 6 Drawing Sheets

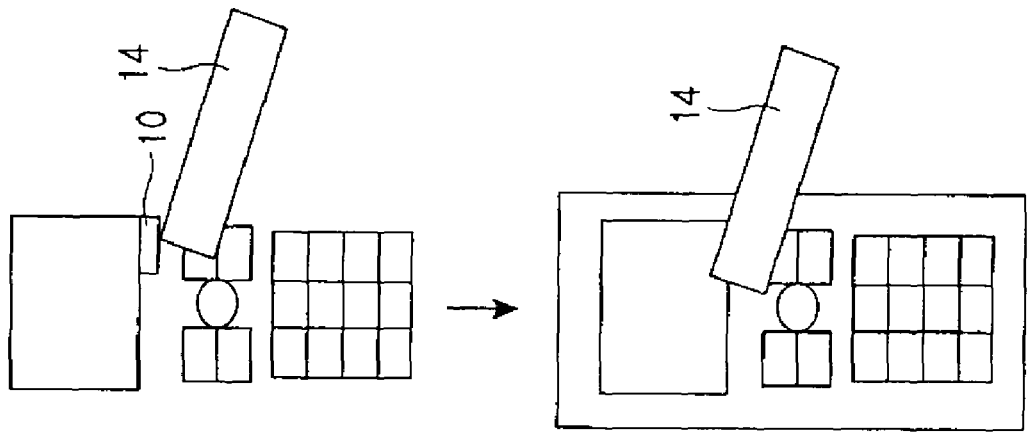
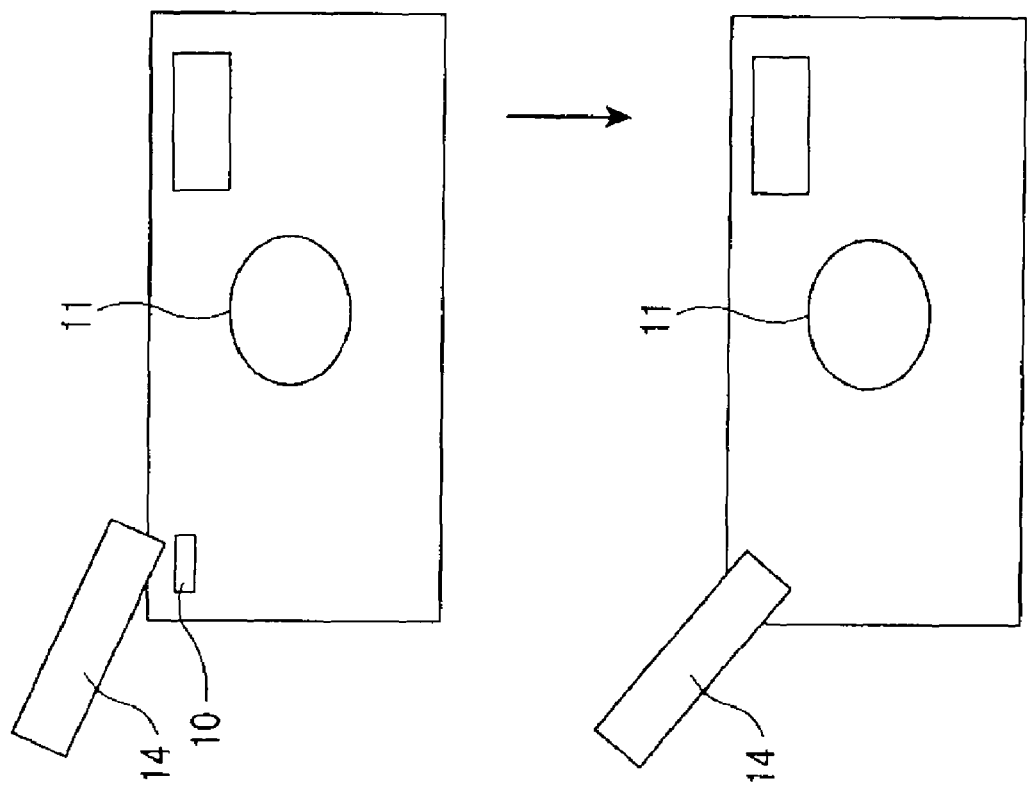
FIG.1A
FIG.1B

PHOTOGRAPHING METHOD AND APPARATUS USING AN INFRARED SENSOR TO CONTROL PLURAL CAMERA FUNCTIONS

CLAIM OF PRIORITY

This application claims priority to application entitled "photographing method and apparatus using infrared ray in portable terminal" filed with the Korean Intellectual Property Office on Aug. 24, 2007 and assigned Serial No. 2007-85486, the contents of which are incorporated herein by reference in its entirety.

BACKGROUND OF THE INVENTION

1. Field of the Invention

The present invention relates to a photographing method of a portable terminal having a camera, and more particularly to an apparatus and method for taking a photograph without an operation of pressing a shutter release button. This can be accomplished, for example, by using an infrared sensor which minimizes deterioration of image quality due to shaky hands or a shake of the photographing apparatus upon taking a picture.

2. Description of the Related Art

Recently, mobile terminals have been designed to have various functions in addition to basic voice communication, thereby serving users' convenience. Data rates continuously improve as information communication technology rapidly develops, and the amount of data which can be communicated efficiently has been expanded. In addition, mobile electronic apparatuses, such as mobile phones or notebooks, are presently equipped with an imaging device, such as a CCD image sensor or CMOS image sensor. These mobile electronic apparatuses including an imaging device have been popularized, and have the capability to transmit image data photographed by a camera module in real time.

Such mobile terminals, especially portable phones to be put into the market in the future, are to be equipped with high-pixel density cameras according to the tendency of portable phones to possess multi-functionality. Current portable phones have been upgraded to a MEGA class via a VGA class from the existing CIF class, so that mobile terminals are now in substantial competition with existing digital cameras boasting high pixel density.

The application of a high-pixel-density image sensor increases a resolution and makes it possible to take a picture of a high quality. However, it can cause a problem that since portable phones are increasingly designed to be smaller and smaller, a user having shaky hands during an operation of pressing the shutter release button will take pictures that are distorted. Such shakiness can cause a blur in a photographed picture, and can cause a blur in the beginning part of photographed contents in the case of a moving picture. In the case of a still picture with a relatively short exposure time, even a photographing apparatus not embedded in a mobile terminal requires a predetermined time and/or pressure for mechanically or electrically operating the shutter release, such as by pressing a button, shaking causes a substantial blur. Also, when the user fails in applying requisite minimum pressure of predetermined force, a result different from a subject's image desired by the user may be obtained.

In addition, users can connect a remote controller or a device to a photographing apparatus (either wired or wirelessly) in order to take a picture, when an auxiliary device for photographing is required. Since using an auxiliary device to take a picture may not be a familiar method of operating a photographic apparatus, different from a general method of handling a photographing apparatus through use of a photographing button, the user can be inconvenienced until he/she becomes accustomed to using the auxiliary device.

SUMMARY OF THE INVENTION

Accordingly, the present invention has been made to solve the above-mentioned problems occurring in the prior art. The present invention provides a photographing method of a portable terminal having a camera, and provides a photographing apparatus and method using an infrared ray and infrared sensor, which enables a picture to be taken without an operation of pressing a shutter release button. This minimizes deterioration of image quality due to shaky hands or a shake of the photographing apparatus.

In accordance with an aspect of the present invention, there is provided an apparatus including: a camera module for photographing an image; a display unit for providing a preview for the image photographed by the camera module; and an infrared sensor unit for determining if emitted radiation is at least partially obstructed by emitting and receiving an infrared ray and generating a photographing signal based at least in part on said determining.

In accordance with another aspect of the present invention, there is provided a of signaling a camera module in a portable terminal to photograph an image, the method including the steps of: emitting an infrared ray, receiving an infrared ray which is reflected among the emitted infrared ray; detecting a resistance value changed depending on the received infrared ray, and comparing the detected resistance value with a threshold value; and generating a photographing signal when the resistance value is equal to or less than the threshold value

BRIEF DESCRIPTION OF THE DRAWINGS

The above and other aspects, features and advantages of the present invention will be more apparent from the following detailed description taken in conjunction with the accompanying drawings, in which:

FIGS. 1A and 1B are views schematically illustrating the configuration of a part of photographing apparatuses using infrared rays according to an exemplary embodiment of the present invention;

DETAILED DESCRIPTION OF THE INVENTION

Hereinafter, an exemplary embodiment of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

In the following description, a portable terminal includes a photographing apparatus, a cellular phone, a personal communication service (PCS), a wireless compound terminal, etc. The following description will be given on the assumption that the portable terminal has the general configuration of the exampled devices.

FIGS. 1A and 1B are views schematically illustrating the configuration of a part of photographing apparatuses using infrared rays according to an exemplary embodiment of the present invention, in which the left side of each figure shows a general photographing apparatus and the right side shows a mobile terminal to which the present invention is applied. In addition, FIG. 1A shows apparatuses in a wait state prior to photographing, and FIG. 1B shows apparatuses in an active state of performing a photographing operation.

First, referring to FIGS. 1A and 1B, when the user selects a subject or background to be photographed while the photographing apparatus is in a power-on state, the user starts an operation of taking a picture while looking at a preview image displayed in a screen through a camera lens 11. The user operates the shutter release by screening an infrared sensor 10 using a part of the user's body or a predetermined object 14 so as to obstruct the infrared ray of the infrared sensor 10. This signals the device to take a photograph. As a result, the user takes a desired picture through just an action of screening the infrared sensor 10 without the conventional handing of a shutter release button for photographing. The infrared sensor 10 may be installed on any part of the apparatus, for example the front, one side, etc., according to the structural characteristics of portable terminals.

Figures 2A, 2B:
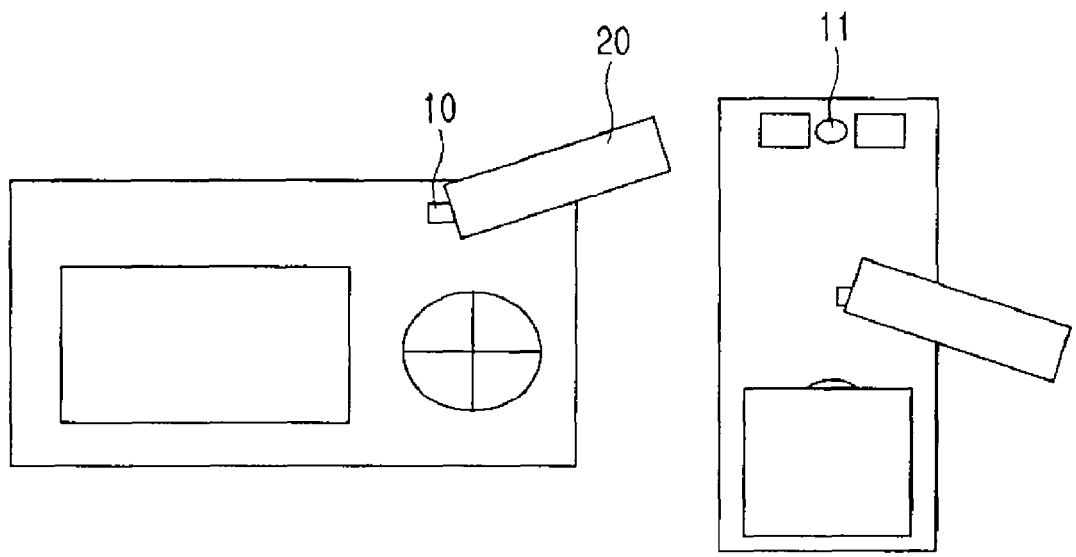
FIGS. 2A to 2D are views schematically illustrating a photographing operation by photographing apparatuses using infrared rays according to an exemplary embodiment of the present invention.
Figures 2C, 2D:
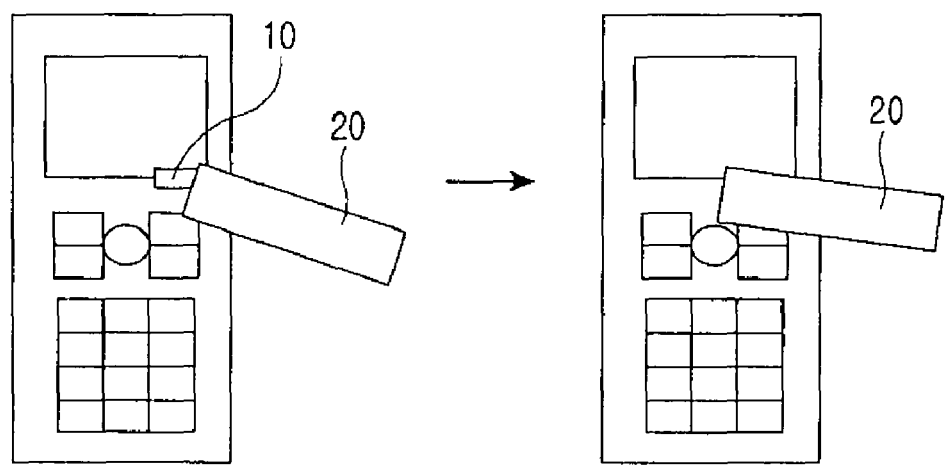

FIGS. 2A and 2B are views schematically illustrating a photographing operation by photographing apparatuses using infrared rays according to an exemplary embodiment of the present invention, in which the left side shows a general photographing apparatus and the right side shows a mobile terminal to which the present invention is applied. In addition, FIG. 2C shows an apparatus in a wait state prior to photographing, and FIG. 2D shows an apparatus in an active state of performing a photographing operation.

FIGS. 2A to 2D show an operation for close-up photographing to magnify and photograph a subject and a photographing operation using a half shutter function. A half shutter function automatically adjusts the focus of a camera toward a subject when a shutter release button is depressed by a half-stroke in order to achieve stable photographing according to the photographing purpose of the user. Referring to FIGS. 2A to 2D, in a power-on state, the user determines a subject or background to be photographed, screens a portion of an infrared sensor 10 using a part of the user's body or a predetermined object 20 while looking at a preview image displayed in a screen through a camera lens 11. This causes a close-up operation or half-shutter operation, as described above. To perform a photographing operation, the user then obstructs the entire infrared ray of the infrared sensor 10.

Generally, the close-up operation and the half-shutter operation are supported in a form of selection modes in a camera. When the user selects one of the modes to enable one of the two operations, photographing is performed after the lens of the camera is automatically adjusted to get an appropriate exposure and to be focused at a subject according to the selected mode. This selectivity can be achieved in the photographing apparatus according to the present invention in such a manner that the photographing apparatus controls the intensity of the infrared ray output from the infrared sensor 10 depending on which selection mode the user desires.

Meanwhile, according to another exemplary embodiment of the present invention, photographing through the close-up operation and the half-shutter operation may be activated by the user screening the infrared sensor 10 using a part of the user's body or a predetermined object 20. When the user screens the infrared ray of the infrared sensor 10 this signals the device to perform the close up operation or half shutter operation. The desisting of screening the infrared sensor 10 signals the device to enable the shutter release and take a photograph. The operation of obstructing the infrared ray of the infrared sensor 10 and releasing the obstruction can be controlled based on a resistance value which is generated by a variation of current according to the intensity of the infrared ray sensed from the infrared sensor 10. Therefore, the photographing operation can be controlled by an output signal corresponding to a resistance value which is altered depending on the intensity of the infrared ray.

As described above an infrared sensor can be applied to a portable terminal having a photographing device, and can be used to signal a device to take a picture. This prevents unnecessary shaking of the photographing device due to physical handling of a shutter release button upon taking the picture. Hereinafter, the configuration of a photographing apparatus using an infrared ray sensor in a portable terminal according to an exemplary embodiment of the present invention will be described in more detail with reference to the block diagram shown in FIG. 3.

Figure 3:
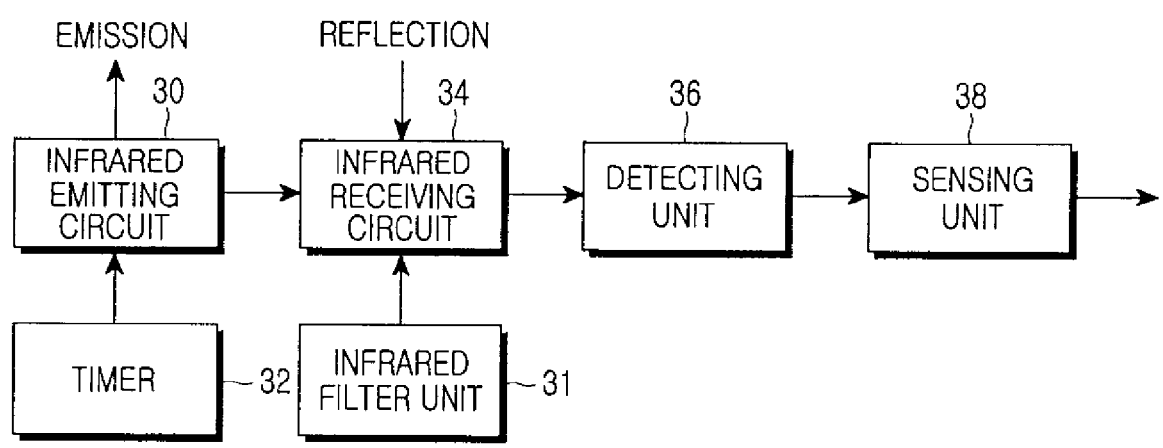
FIG. 3 is a block diagram illustrating the configuration of a photographing apparatus using an infrared ray in a portable terminal according to an exemplary embodiment of the present invention.

FIG. 3 is a block diagram illustrating the configuration of an infrared sensor unit connected with or contained within a photographing apparatus using an infrared ray in a portable terminal according to an exemplary embodiment of the present invention. The infrared sensor unit includes: an infrared emitting circuit 30, an infrared filter unit 31, an infrared receiving circuit 34, a detecting unit 36, a timer 32, and a sensing unit 38.

The infrared emitting circuit 30 emits an infrared ray which is capable of being reflected by a surface before it and upon reflection is transmitted to the infrared receiving circuit 34. In this case, for example, when the infrared emitting circuit 30 emits an infrared ray, the amount of reflection of the infrared ray is changed depending on the color of the surface before it. For this reason, the infrared receiving circuit 34 may or may not receive an infrared ray, or a substantial portion thereof. In the case where the surface has a bright color, when the infrared emitting circuit 30 emits an infrared ray, the infrared receiving circuit 34 receives a substantial portion of the reflected infrared ray and generates a signal. This is because the bright color can reflect even a small amount of the infrared ray. In the case where the surface has a dark color, when the infrared emitting circuit 30 emits an infrared ray, the infrared receiving circuit 34 receives an insufficient portion of the infrared ray to generate a signal because the dark color absorbs a substantial portion of the infrared ray.

Radiation received by the infrared receiving circuit 34 may additionally include exterior light (i.e., visible and ultraviolet) in addition to a reflected infrared ray. In order to prevent the infrared sensor unit from malfunctioning due to detecting radiation from a source other than the infrared ray at the infrared receiving circuit 34, exterior light can be filtered through the infrared filter unit 31. The filtering of exterior light by the infrared filter unit 31 is achieved in such a manner as to allow radiation of a limited frequency range, including radiation specific to an infrared ray emitted by the infrared emitting circuit 30, to contact infrared receiving circuit 34. This limits malfunctions in detection by substantially limiting the frequency range of radiation allowed to reach infrared filter unit to the desired signal radiation.

In addition to the aforementioned method of filtering a specified frequency in order to prevent a malfunction, an infrared ray can be distinguished from exterior light by modulation to a high frequency. This modulated infrared ray can be emitted from the infrared emitting circuit 30, and the infrared receiving circuit 34 tunes and amplifies only the infrared ray modulated to the high frequency.

Since the configurations for the aforementioned infrared filtering method and tuning/amplifying method are known to one of ordinary skill in the relevant art, a detailed description thereof will be omitted.

The detecting unit 36 detects a resistance value of the infrared receiving circuit 34. The resistance value can change depending on the intensity of a voltage detected by infrared receiving circuit 34 based on the amount of reflection of the infrared ray.

In more detail, when an infrared emitting element of the infrared emitting circuit 30 emits an infrared ray, current flows through an infrared receiving sensor of the infrared receiving circuit 34 by a reflected and received infrared ray. The resistance value of the infrared receiving circuit 34 increases based on Ohm's law, so that the voltage across a resistor becomes low. That is, this represents a case where radiation is received from an exterior source.

In contrast, although the infrared emitting element emits an infrared ray, when an infrared receiving sensor receives an insufficient amount of reflected infrared ray, current is not generated, thereby decreasing the resistance value of the infrared receiving circuit 34 based on Ohm's law. In this circumstance the voltage across the resistor becomes high.

Therefore, the detecting unit 36 outputs a resistance value detected from the infrared receiving circuit 34, which can change depending on whether or not exterior light is obstructed, to the sensing unit 38. The sensing unit 38 reads the resistance value input from the detecting unit 36, determines if light is obstructed, and outputs a signal corresponding to a result of the determination to a controller (not shown). This notifies the controller that a photographing operation should be performed or that is should be in a wait state.

Timer 32 functions to check an ON time period of the infrared emitting element. The infrared emitting element has a characteristic that, when the infrared emitting circuit having a low resistance value in total continuously emits an infrared ray, a great deal of current flows through the infrared emitting element. This shortens the lifetime of an infrared emitting diode. Therefore, the timer 32 limits the emission of an infrared ray by the infrared emitting circuit to a short time period at intervals in such a manner as to turn off the emitting operation when a predetermined time has elapsed.

Hereinafter, a method of performing photographing operation using an infrared ray sensor in a portable terminal according to an exemplary embodiment of the present invention will be described with reference to the aforementioned components and FIG. 4.

Figure 4:
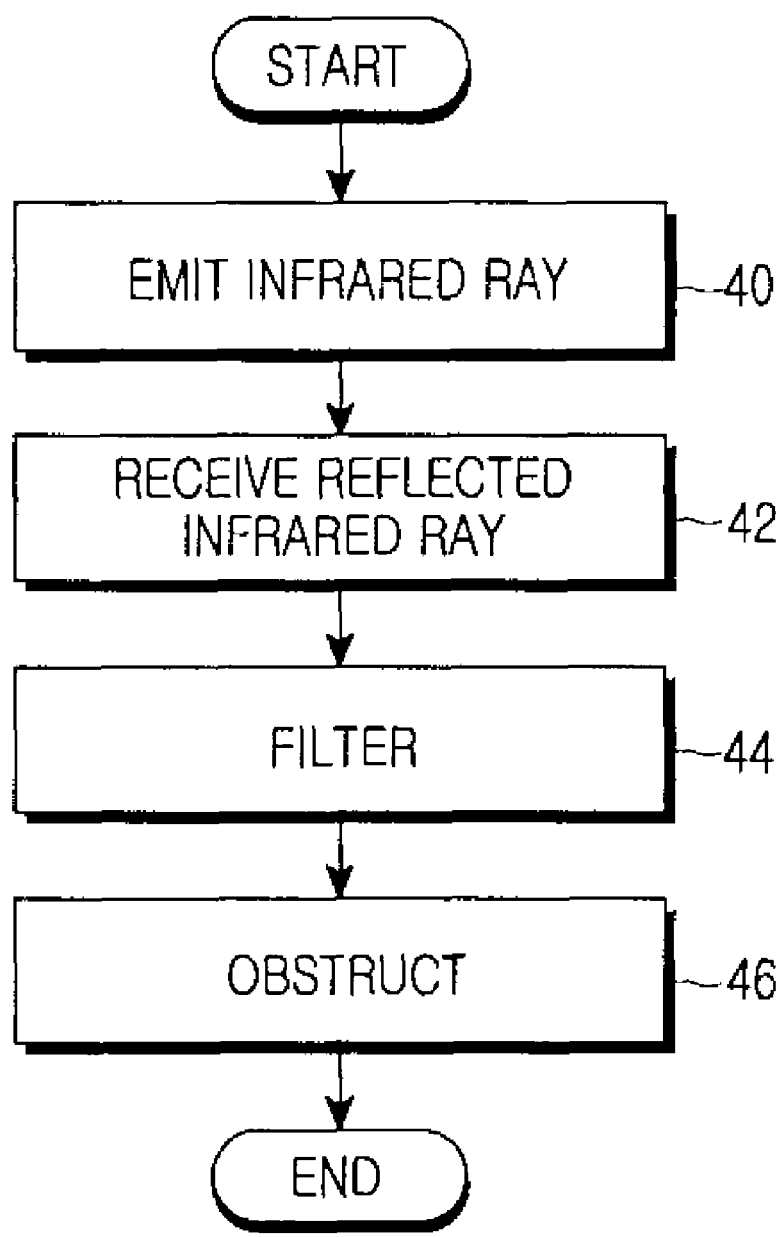
FIG. 4 is a flowchart illustrating the general operation of a photographing method using an infrared ray in a portable terminal according to an exemplary embodiment of the present invention.

FIG. 4 is a flowchart illustrating a photographing method using an infrared ray in a portable terminal according to an exemplary embodiment of the present invention.

An infrared emitting element emits an infrared ray in step 40. In this example, the entire or a part of the infrared ray emitted by the infrared emitting element is reflected and received by a receiving sensor in step 42, and a filtering operation is performed with respect to the received infrared ray in step 44. Here, the filtering is performed such that the receiving sensor receives light within an infrared range so that a color tuning value preset in a camera may be prevented from deteriorating.

In addition, in one example, the filtering filters off visible rays and ultraviolet rays and allows transmission of the received infrared ray. This prevents the infrared sensor from malfunctioning due to exterior light.

After a certain time period, a photographing may be performed when the infrared ray of the infrared sensor is obstructed in step 46.

In the case of a close-up photographing or half-shutter operation, step 46 may be established such that the close-up operation or half-shutter operation is performed when the infrared ray is obstructed, and a photographing is performed when the obstruction is released.

The operation of the infrared emitting element performed in step 40 will now be described in detail with reference to FIG. 5.

Figure 5:
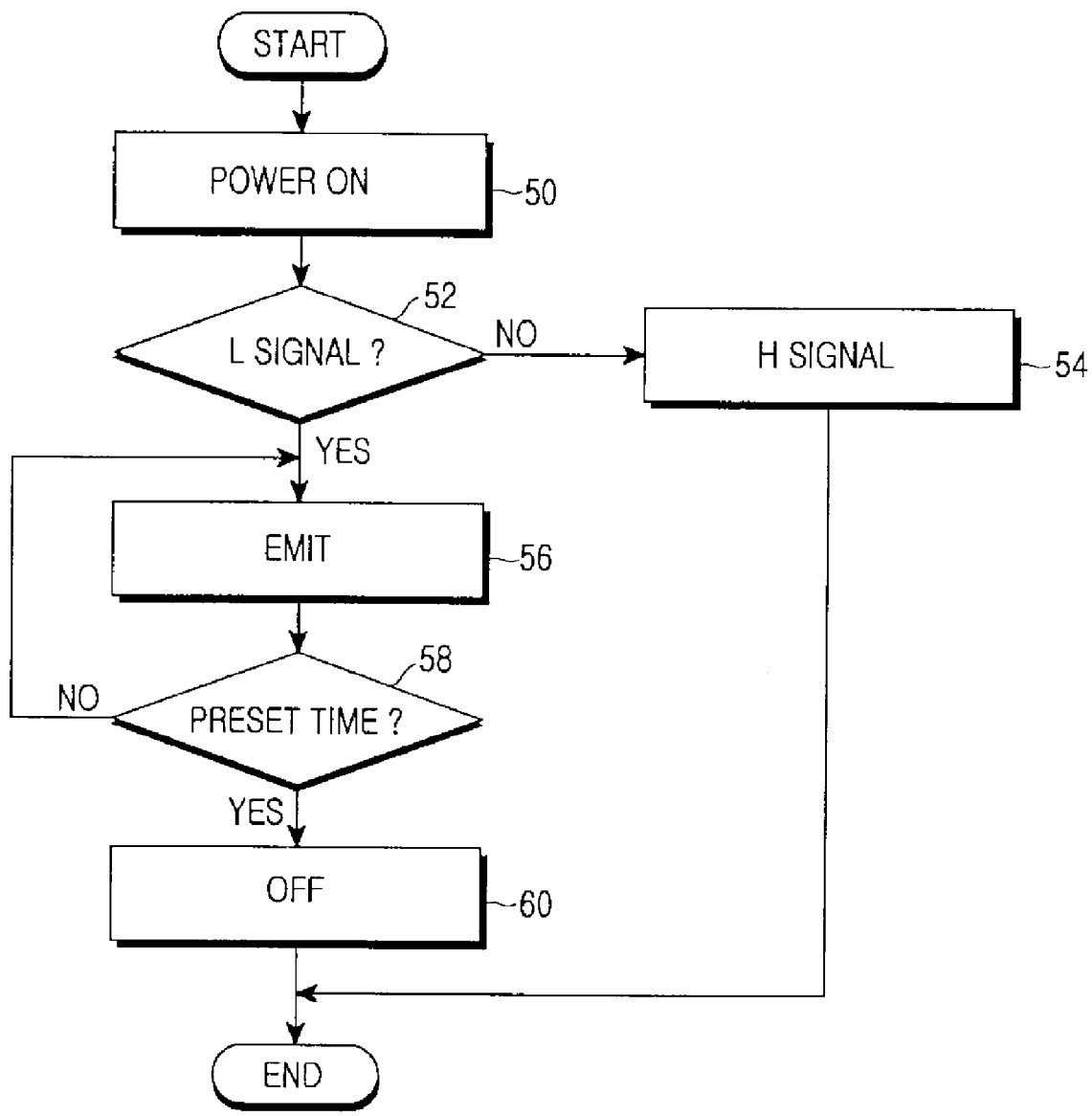
FIG. 5 is a flowchart illustrating the operation of an infrared emitting element for a photographing method using an infrared ray in a portable terminal according to an exemplary embodiment of the present invention.

FIG. 5 is a flowchart illustrating a photographing method using an infrared ray in a portable terminal according to an exemplary embodiment of the present invention. When the portable terminal is powered on in step 50, an L signal or an H signal is applied by a controller. In steps 52 and 54, the controller controls the operation of the portable terminal based on the intention of the user. The L signal corresponds to an instruction signal generated to emit an infrared ray, and the H signal corresponds to an instruction signal generated to stop the emission of the infrared ray. When the infrared emitting element continuously emits an infrared ray, a great deal of current flows through the infrared emitting element, shortening the lifetime of an infrared emitting diode. Therefore, the infrared emitting element should be maintained in an on state only during a predetermined time period. For this reason, the L signal or the H signal is generated to control the on/off operation of the infrared emitting element.

When the L signal is applied in step 52, the infrared emitting element emits an infrared ray in step 56. When the emitting time is checked and it is determined that the a preset time has elapsed in step 58, the emitting operation of the infrared emitting element is turned off in step 60. If it is determined that the preset time has not elapsed, step 56 is continuously performed.

Figure 6A:
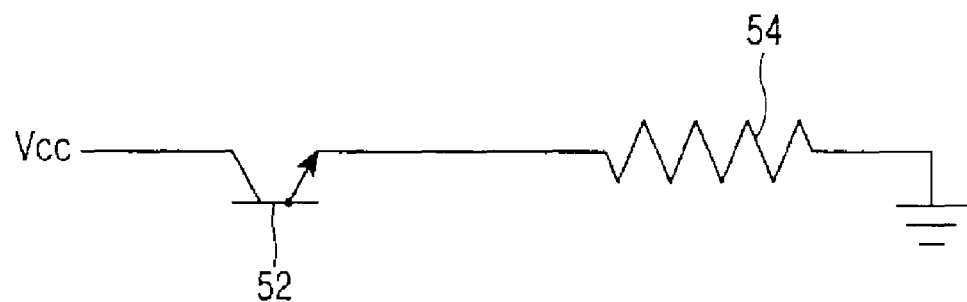
FIGS. 6A and 6B are circuit diagrams schematically illustrating the configurations of the infrared receiving circuit and the infrared emitting circuit.
Figure 6B:
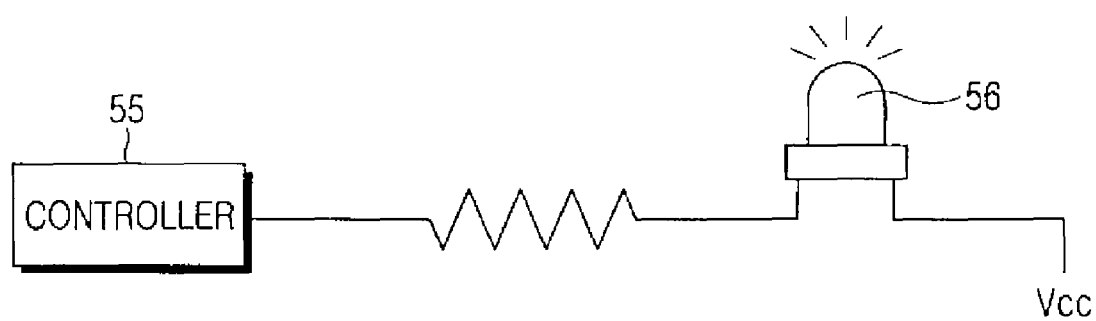

FIGS. 6A and 6B are circuit diagrams schematically illustrating the configurations of the infrared receiving circuit 34 and the infrared emitting circuit 30. First, referring to FIG. 6A, the infrared receiving circuit 34 includes a power source Vcc(+), a switching unit 52 having a resistance value which is varied depending on a switching control signal, and a resistor R1 of the infrared receiving circuit 34. Resistor R1 can be connected serially to the switching unit 52. The voltage across the resistor R1 changes depending on the resistance value of the switching unit 52. While light is not received, there is no current flowing through the switching unit 52, and the switching unit 52 has a high resistance value, so that the voltage across the resistor R1 becomes low. In contrast, while the infrared receiving sensor receives an infrared ray, current flows through the infrared receiving circuit, and the switching unit 52 has a low resistance value, so that the voltage across the resistor R1 becomes high.

Therefore, in the infrared receiving circuit 34, the voltage across the resistor R1 varies depending on the reflecting properties (i.e., color) of a surface which reflects an infrared ray emitted by an infrared emitting element, thereby sensing if the infrared ray is obstructed.

Referring to FIG. 6B, the infrared emitting circuit 30 includes an infrared emitting element 56, a resistor R2 whose first terminal is connected a first terminal of the infrared emitting element 56, a power source Vcc connected to a second terminal of the infrared emitting element 56, and a controller 55 connected to a second terminal of the resistor R2 so as to power on the infrared emitting element 56. The controller 55 generates an L signal when desiring to emit an infrared ray, and generates an H signal when not desiring to emit an infrared ray. This can be used to control whether nor not the infrared emitting element is to emit an infrared ray.

As described above, the photographing method and apparatus using an infrared ray in a portable terminal according to the present invention enables the user to take a picture just by an operation of screening the infrared sensor from exterior light upon photographing by a camera, so that it is possible to minimize deterioration of an image quality due to shaky hands or a shake of the photographing apparatus.

The photographing method and apparatus using an infrared ray sensor in a portable terminal according to the present invention can be implemented as described above. While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. An apparatus in a portable terminal comprising:
a camera module for photographing an image;
a display unit for providing a preview for the image photographed by the camera module; and
an infrared sensor unit for:
  determining if emitted radiation is at least partially obstructed by receiving a reflection of the emitted radiation, the emitted radiation being an infrared ray, and
  generating a first photographing signal when the determination indicates at least a partial obstruction of the emitted radiation has occurred and a second photographing signal as the partial obstruction increases.

2. The apparatus as claimed in claim 1, wherein the infrared sensor unit comprises:
an infrared emitting circuit for emitting the infrared ray;
an infrared receiving circuit for receiving a reflected infrared ray which comprises at least a portion of the emitted infrared ray;
a detecting unit for detecting a resistance value determined based at least in part on the received infrared ray, and comparing the detected resistance value with a threshold value; and
a sensing unit for outputting the first photographing signal when the resistance value is equal to or less than the threshold value and the second photographing signal as the resistance value further decreases.

3. The apparatus as claimed in claim 1, wherein the infrared sensor unit further comprises a filter unit for filtering at least a portion of visible rays and ultraviolet rays.

4. The apparatus as claimed in claim 2, wherein the infrared emitting circuit modulates the infrared ray to a specified frequency before emitting.

5. The apparatus as claimed in claim 2, wherein the infrared receiving circuit tunes and amplifies an infrared ray modulated to a specified frequency.

6. The apparatus as claimed in claim 2, wherein the resistance value is determined depending on an amount of reflection of the emitted infrared ray detected the infrared sensor.

7. The apparatus as claimed in claim 6, wherein the amount of reflection is maximized when a surface reflecting the infrared ray has a substantially light color.

8. The apparatus as claimed in claim 6, wherein the amount of reflection is minimized when a surface reflecting the infrared ray has a substantially dark color.

9. The apparatus as claimed in claim 1, wherein the photographing of the image is performed when exterior light is obstructed by a part of the user's body or a predetermined means while at least a portion of the emitted infrared ray is reflected and received by the infrared sensor unit.

10. The apparatus claimed in claim 1, wherein the infrared sensor unit is coupled to an exterior surface of the portable terminal.

11. A method of signaling a camera module in a portable terminal to photograph an image comprising:
emitting an infrared ray;
receiving an infrared ray comprising at least a portion of said emitted infrared ray reflected off a surface;
detecting a resistance value changed depending on the received infrared ray;
comparing the detected resistance value with a threshold value; and
generating a first photographing signal when the resistance value is equal to or less than the threshold value for adjusting a lens position of the camera module; and
generating a second photographing signal when the resistance value further decreases, the second photographing signal causing the photograph of the image.

12. The method as claimed in claim 11, further comprising a step of obstructing light received from an exterior during the receiving step.

13. The method as claimed in claim 11, wherein the threshold value is a value for determining if light received from an exterior is obstructed.

14. The method as claimed in claim 11, wherein the resistance value is changed depending on an amount of reflection of the emitted infrared ray.

15. The method as claimed in claim 14, wherein the amount of reflection is maximized when a flat surface reflecting the infrared ray has a substantially light color.

16. The method as claimed in claim 14, wherein the amount of reflection is minimized when a flat surface reflecting the infrared ray has a substantially dark color.

17. The method as claimed in claim 10, wherein the photographing signal further comprises signaling the portable terminal to perform a close up operation or half shutter operation.

* * * * *